(12) United States Patent
Park et al.

(10) Patent No.: US 9,266,070 B2
(45) Date of Patent: Feb. 23, 2016

(54) OIL PURIFICATION METHOD AND APPARATUS WITH POROUS MEMBRANE

(75) Inventors: Han Oh Park, Daejeon (KR); Jae Ha Kim, Daejeon (KR); Myung Kuk Jin, Daejeon (KR)

(73) Assignee: BIONEER CORPORATION (KR)

( * ) Notice: Subject to any disclaimer, the term of this patent is extended or adjusted under 35 U.S.C. 154(b) by 843 days.

(21) Appl. No.: 13/472,736

(22) Filed: May 16, 2012

(65) Prior Publication Data

US 2012/0223017 A1  Sep. 6, 2012

Related U.S. Application Data

(63) Continuation-in-part of application No. 13/201,319, filed on Aug. 12, 2011, now Pat. No. 8,887,926.

(30) Foreign Application Priority Data

Mar. 27, 2009 (KR) .......................... 10-2009-0026356

(51) Int. Cl.
| | |
|---|---|
| B01D 71/02 | (2006.01) |
| B01D 61/00 | (2006.01) |
| B01D 69/14 | (2006.01) |
| B01D 67/00 | (2006.01) |
| B01D 69/06 | (2006.01) |
| B01D 69/08 | (2006.01) |
| B82Y 30/00 | (2011.01) |
| B01D 61/14 | (2006.01) |

(52) U.S. Cl.
CPC .......... *B01D 69/141* (2013.01); *B01D 67/0041* (2013.01); *B01D 67/0083* (2013.01); *B01D 69/06* (2013.01); *B01D 69/08* (2013.01); *B82Y 30/00* (2013.01); *B01D 61/14* (2013.01); *B01D 71/021* (2013.01); *B01D 71/022* (2013.01); *B01D 71/024* (2013.01); *B01D 2325/02* (2013.01); *B01D 2325/22* (2013.01)

(58) Field of Classification Search
None
See application file for complete search history.

(56) References Cited

U.S. PATENT DOCUMENTS

| | | | | |
|---|---|---|---|---|
| 1,717,741 | A | * | 6/1929 | Skinner ..................... 123/196 A |
| 5,069,799 | A | | 12/1991 | Brownawell et al. |
| 5,266,207 | A | | 11/1993 | Boye et al. |
| 7,867,158 | B2 | | 1/2011 | Baumann |
| 2003/0116503 | A1 | | 6/2003 | Wang et al. |
| 2005/0263456 | A1 | * | 12/2005 | Cooper et al. ................ 210/660 |
| 2006/0194097 | A1 | | 8/2006 | Kim et al. |

(Continued)

FOREIGN PATENT DOCUMENTS

| | | |
|---|---|---|
| EP | 1654049 | 1/2010 |
| JP | 2006-515706 | 6/2006 |
| KR | 1019990078988 | 11/1999 |

(Continued)

OTHER PUBLICATIONS

Chang-Gun Lee, A Study on The Tribological Characteristics of Graphite Nano Lubricants, International Journal of Precision Engineering and Manufacturing vol. 10, No. 1, Jan. 2009, p. 85.

*Primary Examiner* — Krishnan S Menon
(74) *Attorney, Agent, or Firm* — Cantor Colburn LLP

(57) ABSTRACT

Provided is a method of purifying oil by which nano particles are effectively removed from the oil. According to the oil purifying method, oil is effectively purified at a high temperature using a carbon nanostructure-metal or -metal oxide composite nano porous membrane composed of a carbon nanostructure-metal composite.

4 Claims, 7 Drawing Sheets

(56) References Cited

U.S. PATENT DOCUMENTS

| | | | |
|---|---|---|---|
| 2007/0065638 A1 | 3/2007 | Wang et al. | |
| 2010/0000945 A1* | 1/2010 | Gavalas | 210/650 |

FOREIGN PATENT DOCUMENTS

| | | |
|---|---|---|
| KR | 1020010045761 | 6/2001 |
| KR | 1020010071549 | 7/2001 |
| KR | 1020040014652 | 2/2004 |
| KR | 10-0558966 | 2/2005 |
| KR | 1020050029295 | 3/2005 |
| KR | 200383117 | 4/2005 |
| KR | 200387145 | 6/2005 |
| KR | 1020060061823 | 8/2006 |
| KR | 10-2008-0045226 | 5/2008 |
| KR | 10-2009-0009419 | 1/2009 |
| KR | 10-2009-0123405 | 12/2009 |
| KR | 1020100107960 | 10/2010 |
| KR | 1019960040148 | 9/2012 |
| WO | 9721565 | 6/1997 |
| WO | 2004/005193 | 1/2004 |

* cited by examiner

OIL PURIFICATION METHOD AND APPARATUS WITH POROUS MEMBRANE

TECHNICAL FIELD

The present invention relates to a method and an apparatus for purifying oil that is in use or waste oil using a carbon nanostructure-metal or -metal oxide composite.

BACKGROUND ART

With recent high growth of industries, membrane technology with a high purity separating function is recognized to be very important, and its importance is increased in various fields including chemical industry, food industry, medical industry, medicine, biochemistry, and environmental fields.

In the field of oil, it is recognized to be important in environmental and economical aspects that various oils, for instance, lubricants, are filtered and recycled during use or after use, and thus are used for a longer period of time.

The illustrative lubricants serve to prevent the irregularities of frictional surfaces from being worn or damaged by high pressure and friction, and to reduce the consumption of power, thus increasing the efficiency of the machine. In addition, lubricating oils have a function to absorb heat generated on frictional surfaces and to discharge the absorbed heat to the outside, thus preventing the frictional surfaces from sticking and becoming damaged. Also, lubricating oils serve to disperse a load concentrated on a contact surface and provide sealing between two frictional surfaces so as to prevent the entry of water or dirt. Moreover, lubricating oils serve to prevent a lubricated surface from being corroded by oxygen and water.

Such lubricating oils are contaminated by worn metal pieces and burned carbides during the operation of machines so that the performance thereof is reduced. For this reason, a unit for filtering and purifying lubricating oil should be provided in systems, or lubricating oil should be replaced with fresh lubricating oil after it has been used for a given period of time. Also, waste lubricating oil may be recycled for reuse as fuel oil or the like.

A method of removing the impurities from the lubricant includes a method of using a centrifugal separator (Korean Patent Application No. 10-2006-7002799, and European Patent Application No. 20040741406), a method of removing fine iron particles using a magnetic force (Korean Patent Application No. 10-1999-0049190), or a method of filtering impurities using an oil filter (Korean Patent Application Nos. 10-1996-040148, 10-2003-0065486, 10-1990-0014047, and 10-2000-7014517, and European Patent Application No. 2008066756). A method of purifying the waste lubricant after use includes a method of using a compound (Korean Patent Application No. 10-1999-0036078), a method of using a catalyst (Korean Patent Application No. 10-2004-0005708), or a method of using a screw (Korean Utility Model Application Nos. 20-2005-0003461, and 20-2005-0003462).

In the purifying methods, however, micro-particles can be removed by separating and filtering, whereas nano-particles cannot be removed. In particular, the nano-particles having a predetermined size reduce the performance of the lubricant, and thus cause a large obstacle when the lubricant is reused. Such nano-particles have a problem in that they reduce not only the performance and life expectancy of the lubricating oil, but also the oil filters. Also, filtration of the lubricating oil needs to be carried out at high temperatures, because lubricating oil has high viscosity. However, conventional oil filters have a problem in that they are deformed at high temperature, because they are based on polymers.

DISCLOSURE

Technical Problem

The present invention is directed to a method and an apparatus for purifying oil using a carbon nanostructure-metal or -metal oxide composite nano porous membrane, which is capable of removing fine nano-particles from oil that is in use for a machine or waste oil at a high temperature.

Technical Solution

An aspect of the present invention provides a method of purifying oil comprising purification of impurities from the oil using a porous membrane in which a plurality of carbon nanostructure-metal or -metal oxide composites are interconnected to form pores.

Another aspect of the present invention provides a porous membrane for purifying oil, which has pores formed by interconnection of a plurality of carbon nanostructure-metal or -metal oxide composites, and in which a basis weight of the carbon nanostructure-metal or -metal oxide composites ranges from 0.05 mg/cm$^2$ to 10 mg/cm$^2$.

Another aspect of the present invention provides an apparatus for purifying oil, which includes: an oil inflow pipe into which the oil is introduced; an oil purification unit that purifies the oil introduced from the oil inflow pipe and has a porous membrane containing carbon nanostructure-metal or -metal oxide composites; an oil outflow pipe through which the oil purified by the oil purification unit is discharged; and an oil heating unit that heats the oil.

Another aspect of the present invention provides a system for purifying oil, which includes: a machine having an oil inlet and an oil outlet; an oil inflow pipe that is fluid-connected with the oil outlet and introduces the oil discharged from the machine into an oil purification unit; the oil purification unit that purifies the oil introduced through the oil inflow pipe and includes a porous membrane containing carbon nanostructure-metal or -metal oxide composites; and an oil outflow pipe that is fluid-connected with the oil inlet and introduces the oil purified by the oil purification unit into the machine.

Advantageous Effects

According to the present invention, the method and apparatus for purifying oil can remove nano substances from the oil including waste oil by using a nano porous membrane composed of a carbon nanostructure-metal or -metal oxide composite.

Further, the method and apparatus for purifying oil can be used to remove nano substances from a lubricant, and are thus effective in enhancing the lifetime of the lubricant, and can be used as eco-friendly purifying method and apparatus of oils.

BEST MODE

Figure 1:
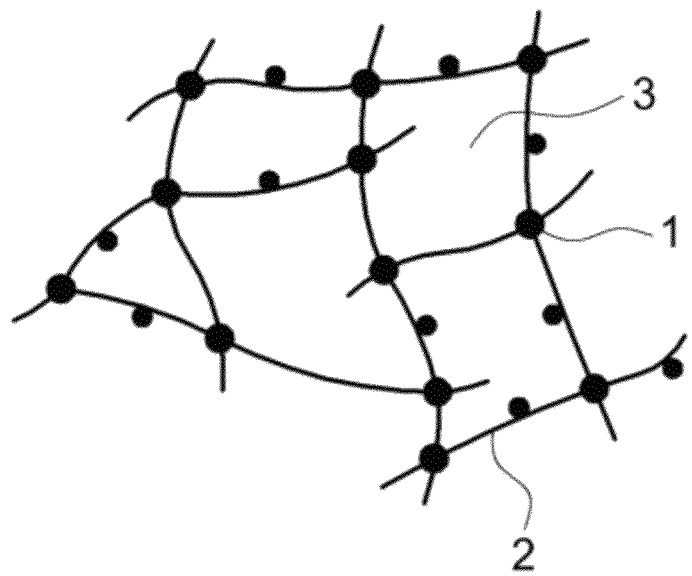
FIG. 1 is a conceptual diagram showing a porous membrane according to an embodiment of the present invention.

In order to achieve the above object, after repeated research, the inventors of the present invention have discovered that fine nano-particles can be removed from the oil by a carbon nanostructure-metal or -metal oxide composite nano porous membrane disclosed in Korean Patent Application No. 10-2009-0026356, the disclosure of which is hereby incorporated herein by reference in its entirety.

Hereinafter, a porous membrane for purifying oil and a method and apparatus for purifying oil will be described in detail. Unless otherwise defined, all technical and scientific terms as used herein have the same meanings as commonly understood by one of ordinary skill in the art to which this invention belongs. In the following description and accompanying drawings, the detailed description of known functions and constructions unnecessarily obscuring the subject matter of the present invention will be avoided.

The term "carbon nanostructure-metal or -metal oxide composite" used herein refers to a composite in which two or more types of metal or metal oxide are uniformly dispersed on the surface of a carbon nanostructure.

The term "uniformly dispersed" used herein does not necessarily refer to mathematical uniformity. In other words, the term is not limited only to the case in which a plurality of types of metal or metal oxide are formed on the surface of the carbon nanostructure at regular intervals, but it includes the case in which the plurality of types of metal or metal oxide are randomly dispersed.

The term "porous membrane" used herein refers to a membrane or a filter in which a plurality of carbon nanostructure-metal or -metal oxide composites are interconnected to form a plurality of pores. The porous membrane may include additional elements, for instance magnetite, as needed in addition to the carbon nanostructure-metal or -metal oxide composite, and be modified with additional organic functional groups, for instance hydrophilic or hydrophobic functional groups. The nano porous membrane refers to a porous membrane having a pore size of several nanometers to hundreds of nanometers.

The term "purification" used herein refers to any process of removing foreign materials or contaminants from a raw material and thereby increasing a purity of the raw material. For example, the purification may include filtration of physically blocking a specific contaminant material and permitting the raw material. Further, the purification may include adsorption of physically or chemically adsorbing and separating a specific material.

The term "oil" used herein refers to a material that is a liquid phase at room temperature, and can be mixed with other oil or an organic solvent without being mixed with water. The oil includes, for instance, vegetable oil, essential oil, petrochemical oil, or synthetic oil. For example, the oil may include a lubricant that is used to reduce a frictional force generated from the frictional surface of a machine, or to dissipate the frictional heat generated from the frictional surface.

The term "impurities" used herein refers to components other than the oil, which are contained in the oil and required purification. In particular, the impurities include fine particles such as iron particles and carbon precipitates having a size of 20 nm or more.

The present invention is directed to a method of purifying oil, which includes a process of purifying impurities from the oil by using a porous membrane in which a plurality of carbon nanostructure-metal or -metal oxide composites are interconnected to form a plurality of pores.

Referring to FIG. 1, the metal or metal oxide (1) of the porous membrane is obtained by melting or sintering nanoscale metal or metal oxide particles. Thus, the porous membrane of a network structure, in which one or more carbon nanostructures (2) are interconnected by the molten or sintered metal or metal oxide nano particles, has pores (3). In detail, when the carbon nanostructures (2), which contain the metal or metal oxide nano particles that are uniformly dispersed on the surfaces of the carbon nanostructures and have a predetermined size, are heated, all or part of the metal or metal oxide particles are molten to consolidate the carbon nanostructures (2) with the other surrounding carbon nanostructures (2). The porous membrane may be formed as a single membrane or a composite membrane supported on a support. The composite membrane, as disclosed in Korean Patent Application No. 10-2009-0026356, may be formed on a support such as a high-efficiency particulate air (HEPA) filter, an ultra-low penetration air (ULPA) filter, a glass fiber filter, a glass powder sintered filter, a polymer unwoven filter, a Teflon membrane filter, a metal powder sintered filter, a metal wire woven filter, or a ceramic filter. For example, when such a support is burnt or dissolved by an alkali solution, the single membrane may be obtained by burning the support or by dissolving the support with the alkali solution.

The nano porous membrane according to the present invention has the pores between the carbon nanostructures. Each pore may have a size of 10 nm to 500 nm, preferably 50 nm to 300 nm, for example, 30 nm to 80 nm. Within this numerical range of the pore size, the impurities to be purified can be filtered with high efficiency. If the pore size is less than the above range, the fluidity of fluid is reduced. If the pore size is too large, the nano-particles cannot be filtered. The pore size of the nano porous membrane may be controlled by the size of the carbon nanostructure or the thickness of the nano porous membrane depending on the amount of the carbon nanostructure-metal or -metal oxide composites. In detail, since the size, e.g. diameter, of the carbon nanostructure varies depending on the type of the carbon nanostructure, the pore size of the nano porous membrane can be controlled by the type of the carbon nanostructure. Further, the pore size of the nano porous membrane can be controlled by the thickness of the nano porous membrane depending on the amount of the carbon nanostructure-metal or -metal oxide composites. The nano porous membrane according to the present invention has pores formed by the interconnection of the carbon nanostructure-metal or -metal oxide composites, in which the basis amount of the carbon nanostructure-metal or -metal oxide composites may range from 0.05 mg/cm$^2$ to 10 mg/cm$^2$, preferably from 0.1 mg/cm² to 10 mg/cm², more preferably from 0.5 mg/cm² to 3 mg/cm², or most preferably from 0.7 mg/cm² to 1.5 mg/cm². If the base amount of the composites is too thin, it may be difficult to form the porous membrane or the pore size may be excessively increased. In contrast, if the base amount of the composites is too thick, the pore size may be excessively reduced or the fluidity of oil may be reduced.

The carbon nanostructure may be selected from single-walled carbon nanotubes, double-walled carbon nanotubes, multi-walled carbon nanotubes, carbon nano horns, carbon nano fibers, graphene, or a combination thereof.

For example, to provide the nano porous membrane with a pore size of 10 nm to 500 nm, the carbon nanostructure may be selected from a single-walled carbon nanotube, a double-walled carbon nanotube, a multi-walled carbon nanotube, or a combination thereof.

In the metal or metal oxide, the metal may include one or more selected from the group consisting of Mg, Al, K, Ca, Sc, Ti, V, Cr, Mn, Fe, Co, Ni, Cu, Zn, Ga, Rb, Sr, Y, Zr, Mo, Ru, Rh, Pd, Ag, Cd, In, Sn, Cs, Ba, La, Ce, Nd, Sm, Eu, Gd, Tb, Hf, Ir, Pt, Tl, Pb, and Bi. For example, the metal may include Ag, Ni, Cu, Co, Sn, or a mixture thereof.

The carbon nanostructure-metal or -metal oxide composite may contain the metal or the metal oxide at a content of 5 to 70% by weight, and the carbon nanostructure at content of 30 to 95% by weight, although this may be modified to depend on the type of the metal and the carbon nanostructure used. If the content of the metal or the metal oxide is less than 5% by weight, it is difficult to connect the carbon nanostructures in the network structure. Further, there is a possibility of not providing stable coupling between the membrane support and the carbon nanostructure-metal or -metal oxide composite. If the content of the metal or the metal oxide is more than 70% by weight, the flow of oil is not smooth because the metal or metal oxide blocks the pores of the nano porous membrane.

In the carbon nanostructure-metal or -metal oxide composite, the metal may each have a size of several nanometers to hundreds of nanometers. More particularly, the metal or metal oxide size may be 1 nm to 500 nm.

The carbon nanostructure-metal or -metal oxide composite may be prepared by mixing and dispersing metal precursors and carbon nanostructures in a reductive solvent, and by heat-treating the mixture. The reductive solvent may be selected from, for instance, a polyhydric alcohol, glycol ether or a mixture thereof. The dispersed mixture may further include a stabilizer. The composite may be prepared by, but is not limited to, the method disclosed in Korean Patent Application No. 10-2009-0026356.

The carbon nanostructure-metal or -metal oxide composite prepared in this way has a structure in which spherical metal particles of 1 nm to 500 nm formed by reduction of the metal or -metal oxide precursors which are coupled to or mixed with the carbon nanostructures.

The nano porous membrane is made by using the carbon nanostructure-metal or -metal oxide composites. For example, the nano porous membrane may be made by coating the carbon nanostructure-metal or -metal oxide composites on a support and heat-treating to connect the metal or metal oxide particles with the carbon nanostructures in a network structure.

When the nano porous membrane is made, the heat treatment is performed at a temperature of 100 to 700° C., preferably at a temperature of 100 to 500° C., for 3 to 10 hours, and thereby the metal particles are molten or sintered in the network structure. The heat treatment may be performed using a high-temperature oven, a heating roller, a high-temperature electric furnace, or an infrared lamp. If the metal particles are formed of silver, the nano porous membrane may be made by heat-treating the metal particles at a very low temperature of 100 to 300° C.

Since the metal or metal oxide of the carbon nanostructure-metal or -metal oxide composites is nano size, the melting point thereof is lower than that of a metal having a bulk size. For this reason, the metal is molten or sintered even by heat treatment at a relatively low temperature, and thus the carbon nanostructure-metal composites of a network structure are interconnected. As a result, a nano porous membrane is made by the carbon nanostructure-metal composites. The nano porous membrane may be made by, for instance, the method disclosed in Korean Patent Application No. 10-2009-0026356, but it is not limited to this method.

In the method of purifying oil according to the present invention, the oil temperature of the purifying process may be higher than, for instance, 50° C., and be lower than a thermal denaturation temperature of oil. The thermal denaturation temperature of oil according to a kind of oil is known in the art. For example, the oil may be thermally denatured at a temperature of generally 200° C., 300° C., or 400° C. or more. A viscosity of the oil is generally higher than that of water. As such viscosity, the oil is insufficient in flow rate when it is filtered. In the case of an automobile lubricant, its viscosity ranges from 300 cP to 1,500 cP at room temperature and is increased to 60,000 cP at −40° C. When the viscosity is high, the flow rate is low when the oil is filtered. Particularly, in the case of the nano porous membrane having nano pores, the flow rate is too low to purify the oil. Thus, to smoothly purify the lubricant, it is necessary to heat the lubricant to the low viscosity of the lubricant. However, in the existing method of purifying oil, the oil filter is made of polymer as a raw material, and thus is deformed at a high temperature. In contrast, the nano porous membrane used in the present invention is made of carbon and metal as constituent components, and thus has no problem even when used for purification at a high temperature. The method of purifying oil according to the present invention can be used for purification at a relatively higher temperature compared to the existing method of purifying oil in case of using the polymeric oil filter. When the purification temperature is lower than 50° C., the flow rate is too low, and thus purification efficiency becomes low. When the purification temperature is higher than the thermal denaturation temperature of the oil to be purified, the quality of the oil is deteriorated.

Further, in the method of purifying oil according to the present invention, the viscosity of the oil in the purifying process may range, for instance, from 1 cP to 300 cP. Since the viscosity of a lubricant at 150° C. is generally known to range from 2 to 10 cP, the purification temperature of the oil can be controlled, for instance, between 70° C. and 200° C., preferably between 100° C. and 150° C. To reduce the viscosity of the oil at the purification temperature so as to be less than 1 cP, the purification temperature should be increased to a very high temperature. In this case, the quality of the oil is deteriorated. When the viscosity is higher than 300 cP, the flow rate becomes too low. The oil filter using the nano porous membrane is used to purify the oil when the oil is in using or used oil. In the case of the lubricant, it is effective to purify the lubricant at high temperature due to high viscosity. Since the nano porous membrane is made of carbon and metal, the nano porous membrane has an advantage in that it can be used for purification at a high temperature from 50° C. to 300° C.

The method of purifying oil of the present invention can be used to purify any oil used for vehicles, ships, insulation, gears, turbines, freezers, bearings, automatic transmissions, compressors, cutting, or thermal media. The method of purifying oil of the present invention can be used to purify the oil that is in using at a vehicle, a ship, an insulation apparatus, a gear box, a turbine apparatus, a freezer, an automatic transmission, and a compressor, or to recycle used waste oil that is used in the above same units.

Further, the oil is not particularly limited, but includes a lubricant. Examples of the lubricant include precision instrument oil for a watch or a gauge, spindle oil for a spindle used in a high-speed rotor of a spinning machine, dynamo oil for a motor or a generator, instrument oil for a bearing of a typical machine, turbine oil for a steam turbine, compressor oil for a cylinder of a gas compressor, mobile or motor oil for lubricating a vehicle engine, aircraft lubricant for an aircraft piston engine, diesel engine oil for a low-speed or high-speed diesel engine and having a high ignition point for a gas engine, marine engine oil such as a high-viscosity lubricant that withstands a high load of a ship engine into which sea water may intrude, axle oil such as a high-viscosity lubricant having an excellent oil property, for instance, by which a train resists an impact under a high load, and cylinder oil having highest viscosity for the interior of a steam engine. The lubricant may also include quenching oil for steel, metal cutting oil, metal anti-corrosion oil, transformer oil, and so on.

In the present invention, impurities separated from the oil are not particularly limited. For example, the impurities may include fine particles, such as iron particles or carbon precipitates, having a size that is greater than 20 nm, 50 nm, 80 nm, 300 nm, or 500 nm. The fine particles may have a size between 30 nm and 80 nm, between 50 nm and 300 nm, or between 100 nm and 500 nm.

The present invention is also directed to an apparatus and a system for purifying oil, each of which includes the porous membrane purifying and recycling used waste oil or circulating and purifying oil in use under a high-temperature environment.

Figure 2:
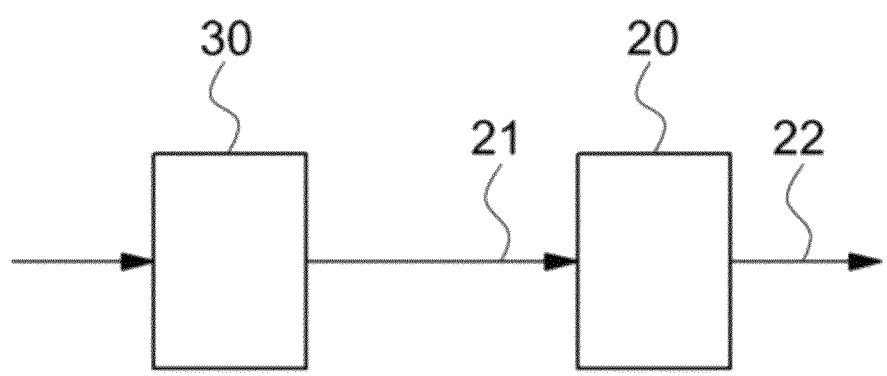
FIG. 2 is a schematic diagram showing an apparatus for purifying waste oil according to an embodiment of the present invention.

The apparatus for purifying oil according to an embodiment of the present invention is an apparatus that purifies and recycles used waste oil. Referring to FIG. 2, the oil purifying apparatus includes an oil inflow pipe (21) into which oil is introduced, an oil purification unit (20) that purifies the oil introduced from the oil inflow pipe (21) and includes a porous membrane containing carbon nanostructure-metal or -metal oxide composites, an oil outflow pipe (22) through which the oil purified by the oil purification unit (20) is discharged, and an oil heating unit (30) that heats the oil. FIG. 2 shows a structure in which the oil heating unit (30) is installed on the oil inflow pipe (21). If necessary, the oil heating unit (30) may be installed on the oil purification unit (20). For example, the oil heating unit (30) may be installed on each of the oil inflow pipe (21) and the oil purification unit (20).

The porous membrane may have a network structure in which metal or metal oxide interconnects carbon nanostructures. The porous membrane has a pore size, for instance, between 10 nm and 500 nm. The detailed description of the porous membrane has been provided above. A configuration of the oil purification unit including the porous membrane may be arbitrarily selected by a person having ordinary skill in the art. For example, the porous membrane may be mounted on the oil purification unit in the form of a flat membrane or a hollow fiber membrane.

The oil heating unit (30) serves to increase the temperature of waste oil to improve the efficiency of purification. The temperature of the purified oil may be higher than 50° C. and lower than the thermal denaturation temperature of the oil. The detailed oil temperature and the appropriate viscosity depending on the temperature have been described above. If the oil temperature of the purifying process can be controlled within the range stated above, the oil heating unit (30) may be installed on any one of the oil inflow pipe (21) and the oil purification unit (20) without substantial restriction. Further, the oil heating unit may include oil heating coils, oil temperature measuring units, and oil temperature controlling units, which may be properly selected according to circumstances by a person having ordinary skill in the art.

Moreover, the oil purifying apparatus may further include an oil cooling unit (not shown in figure) that cools discharged oil. The discharged oil may be cooled at room temperature. However, if there is a subsequent process of packing a container with the purified and recycled oil, the oil purifying apparatus may further include the oil cooling unit that cools heated oil in considering efficiency and stability of the process. The oil cooling unit may include oil cooling unit, oil temperature measuring units, and oil temperature controlling units, which may be properly selected according to circumstances by a person having ordinary skill in the art.

Figure 3:
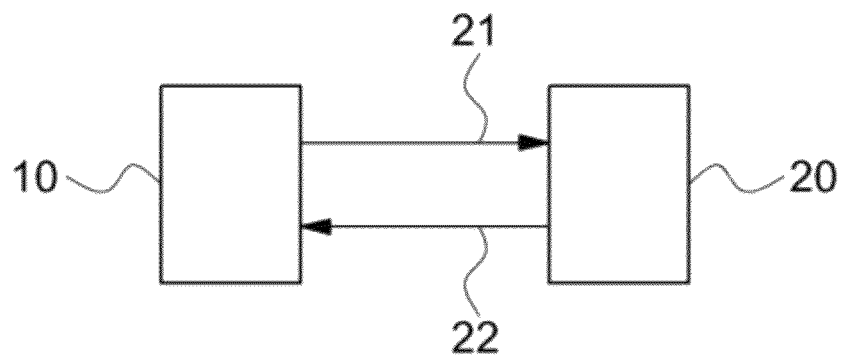
FIG. 3 is a schematic diagram showing a system for purifying oil according to another embodiment of the present invention.
Figure 4:
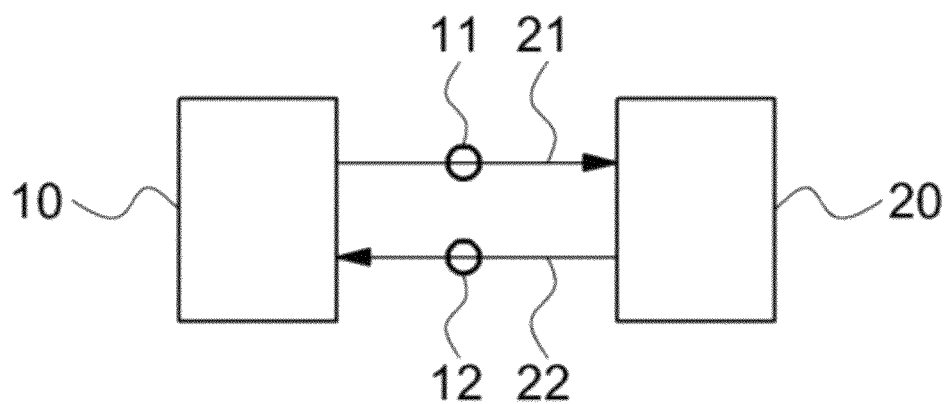
FIG. 4 is a schematic diagram showing a system for purifying oil according to yet another embodiment of the present invention.

An oil purifying system according to another embodiment of the present invention circulates and purifies oil in use at a high-temperature environment. Referring to FIGS. 3 and 4, the oil purifying system includes a machine (10) having an oil inlet and an oil outlet, an oil inflow pipe (21) that is fluid-connected with the oil outlet and introduces the oil discharged from the machine into an oil purification unit, the oil purification unit (20) that purifies the oil introduced through the oil inflow pipe (21) and includes a porous membrane containing carbon nanostructure-metal or -metal oxide composites, and an oil outflow pipe (22) that is fluid-connected with the oil inlet and introduces the oil purified by the oil purification unit (20) into the machine. If necessary, the oil purification unit (20) may be provided with a separate oil heating unit (not shown in figure).

The porous membrane may have a network structure in which metal or metal oxide interconnects carbon nanostructures. The porous membrane has a pore size, for instance, between 10 nm and 500 nm. The detailed description of the porous membrane is as described above. A configuration of the oil purification unit including the porous membrane may be arbitrarily selected by a person having ordinary skill in the art. For example, the porous membrane may be mounted on the oil purification unit in the form of a flat membrane or a hollow fiber membrane.

Unlike the oil purifying apparatus for recycling the waste oil, the oil purifying system of the present embodiment does not essentially require the separate oil heating unit when the oil itself in a machine has a high temperature to a certain degree. However, if the temperature of the oil discharged from the machine is different from the proper purification temperature, the oil purifying system may further include a first temperature control unit (11) that is installed on the oil inflow pipe or the oil purification unit and controls the temperature of the oil discharged from the machine. The first temperature control unit (11) serves to change the temperature of the oil discharged from the machine to a purification temperature suitable for purification, and may include cooling or heating units, temperature measuring units, and temperature controlling units. Further, the oil purifying system may further include a second temperature control unit (12) that is installed on the oil outflow pipe and controls the temperature of the oil introduced into the machine when the temperature of the oil discharged from the oil purification unit is different from the operation temperature at which the oil is used in the machine. The second temperature control unit (12) serves to change the temperature of the oil discharged from the oil purification unit to an operation temperature suitable for operation of the machine, and may include cooling or heating units, temperature measuring units, and temperature controlling units. The oil purifying system of the present invention may further include the first and second temperature control units (11) and (12), which may be properly selected according to circumstances by a person having ordinary skill in the art. If necessary, the oil purification unit (20) may be provided with a separate oil heating unit (not shown in figure).

For example, when the proper operation temperature of a lubricant in a machine is 90° C., a real working temperature of the oil in the machine is 100° C. at a specific time, and the proper purification temperature of the oil is 120° C., the first temperature control unit (11) heats the oil discharged from the machine from 100° C. to 120° C. so as to improve the purification efficiency, and the second temperature control unit (12) cools the oil discharged from the oil purification unit from 120° C. to 80° C. so as to allow the lubricant in the machine to be maintained at the proper operation temperature of 90° C.

MODE FOR INVENTION

Hereinafter, examples will be described for the detailed description of the present invention, but the present invention is not limited to the following examples.

Preparation Example 1

Figure 5:
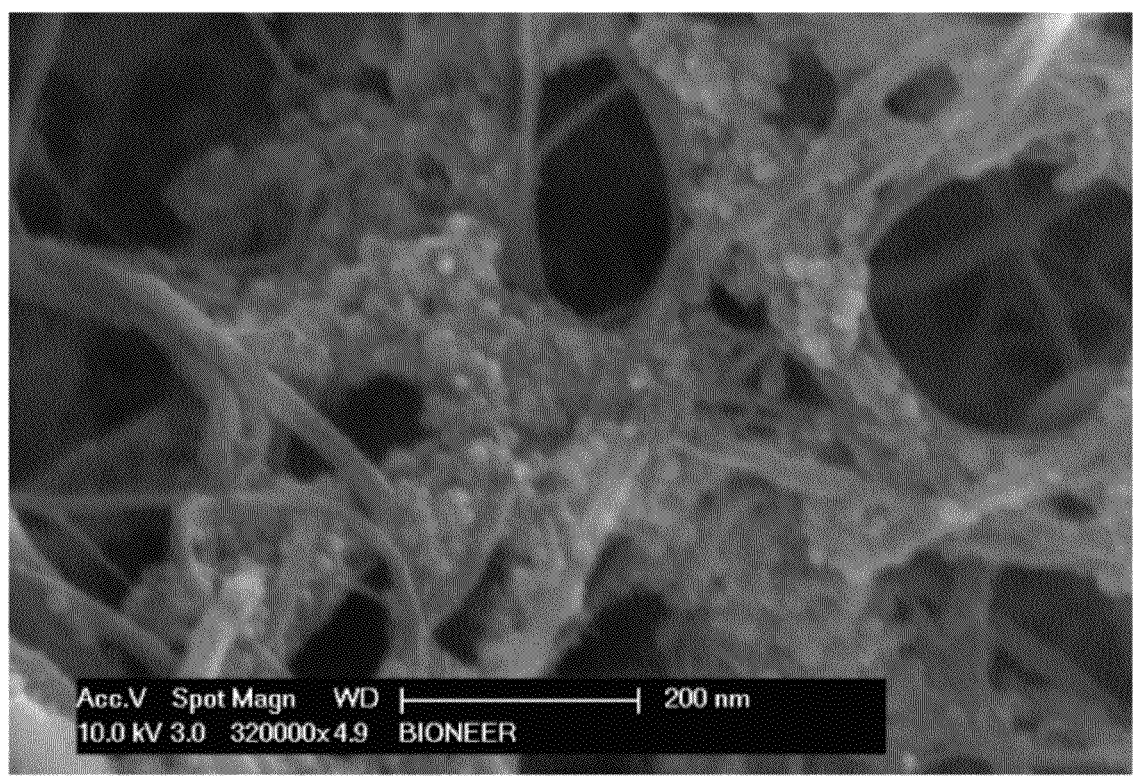
FIG. 5 is a SEM photograph of a carbon nanotube-silver composite prepared in Preparation Example 1.

Preparation of Carbon Nanotube-Silver Composite 0.3 g of multi-walled carbon nanotubes (CM-95, available from Hanwha Nanotech) was put into a 500 ml round flask, and 280 ml of ethylene glycol (EG) was put into a round flask reactor. The round flask reactor was agitated for 30 minutes using an agitator mounted thereon, and then put into an ultrasonic cleaner. The carbon nanotubes were dispersed into the EG for three hours using ultrasonic waves. Here, the temperature of the reactor was controlled so as not to exceed 50° C. When the ultrasonic treatment was terminated, the agitator was mounted on the reactor again, and a thermometer and a cooling condenser were connected to the reactor. The reactor was agitated, and 1.68 g of polyvinylpyrrolidone (PVP) (average molecular weight (Mw) of 40,000, available from Fluka) and 5.6 ml of oleylamine were put into the reactor. Then, 1.102 g of silver nitrate ($AgNO_3$) was put into the reactor. A vacuum pump was connected to the reactor, thereby evacuating air from the reactor and replacing the air with nitrogen. Nitrogen was continuously fed to flow through the interior to the exterior of the reactor so as to block the inflow of oxygen. A mantle was installed on the lower portion of the flask, and the internal temperature of the reactor was increased to 200° C. for 40 minutes. Reaction was carried out for one hour. When the reductive reaction was terminated, the temperature of the reactor was gradually lowered to room temperature for three hours. The synthesized carbon nanotube-silver composite was filtered using a filter paper, and was washed several times with ethyl acetate and hexane, thereby the carbon nanotube-silver composite was yielded. The prepared carbon nanotube-silver composite was photographed using a scanning electron microscope (SEM) and is shown in FIG. 5. It could be observed that the silver nano-particles were spherical and uniformly dispersed with a constant size.

Preparation Example 2

Figure 6:
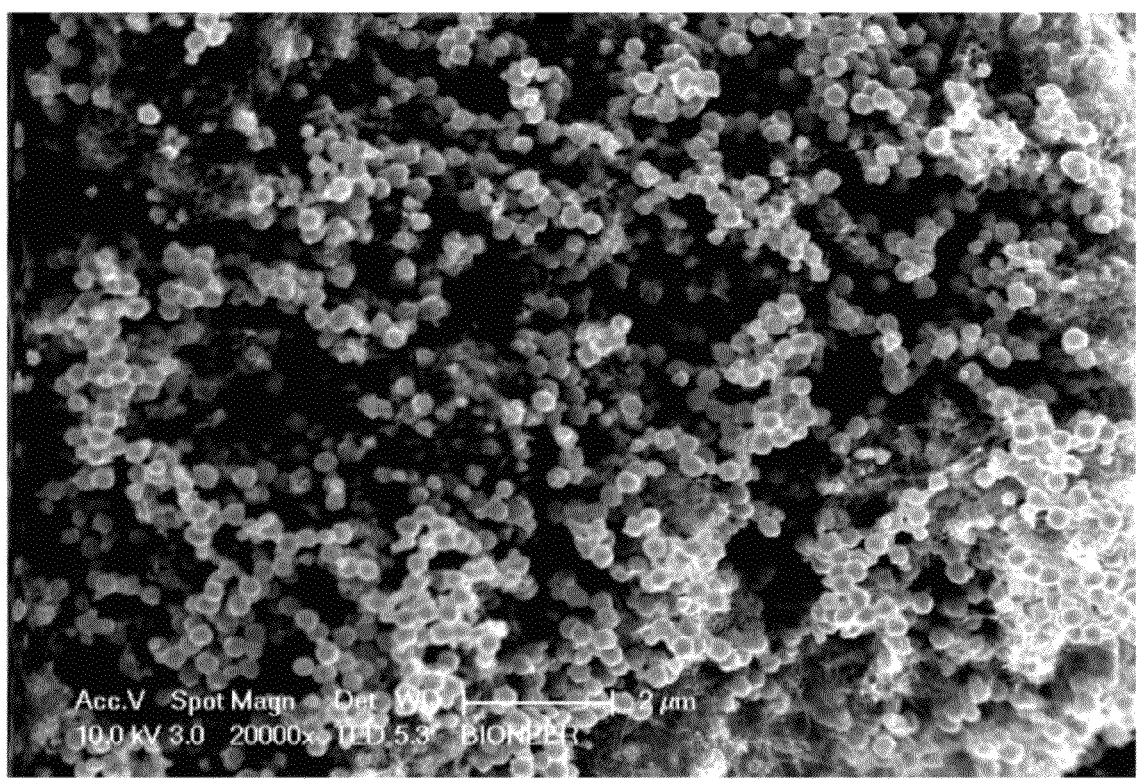
FIG. 6 is a SEM photograph of a carbon nanotube-nickel composite prepared in Preparation Example 2.

Preparation of Carbon Nanotube-Nickel Composite 0.3 g of carbon nanotubes (CM-95, available from Hanwha Nanotech) was put into a 500 ml round flask, and 128 ml of triethylene glycol (TEG) was put into a reactor. The reactor was agitated for 30 minutes using an agitator mounted thereon and then put into an ultrasonic cleaner. The carbon nanotubes were dispersed for three hours using ultrasonic waves. Here, the temperature of the reactor was controlled so as not to exceed 50° C. When the ultrasonic treatment was terminated, the agitator was mounted on the reactor again, and a thermometer and a cooling condenser were connected to the reactor. The reactor was agitated, and 4.26 ml of methyl polyglycol (MPG) ($CH_3(OCH_2CH_2)nOH$, n=4~5, available from Hannong Chemical) was put into the flask reactor. Subsequently, 3.48 g of nickel acetylacetonate was added. A vacuum pump was connected to the reactor, thereby evacuating air from the reactor and replacing the air with nitrogen. Nitrogen was continuously fed to flow through the interior to the exterior of the reactor so as to block the inflow of oxygen. A mantle was installed on the lower portion of the flask, and the internal temperature of the reactor was increased to 280° C. for one hour. The reaction was carried out for 30 minutes. When the reductive reaction was terminated, the temperature of the reactor was gradually lowered to room temperature for three hours. The synthesized composite was filtered using a filter paper and was washed several times with ethanol, thereby the carbon nanotube-nickel composite was yielded. The prepared carbon nanotube-nickel composite was photographed using a SEM and is shown in FIG. 6. It could be observed that the nickel nano-particles were spherical and uniformly dispersed with a constant size.

Preparation Example 3

Figure 7:
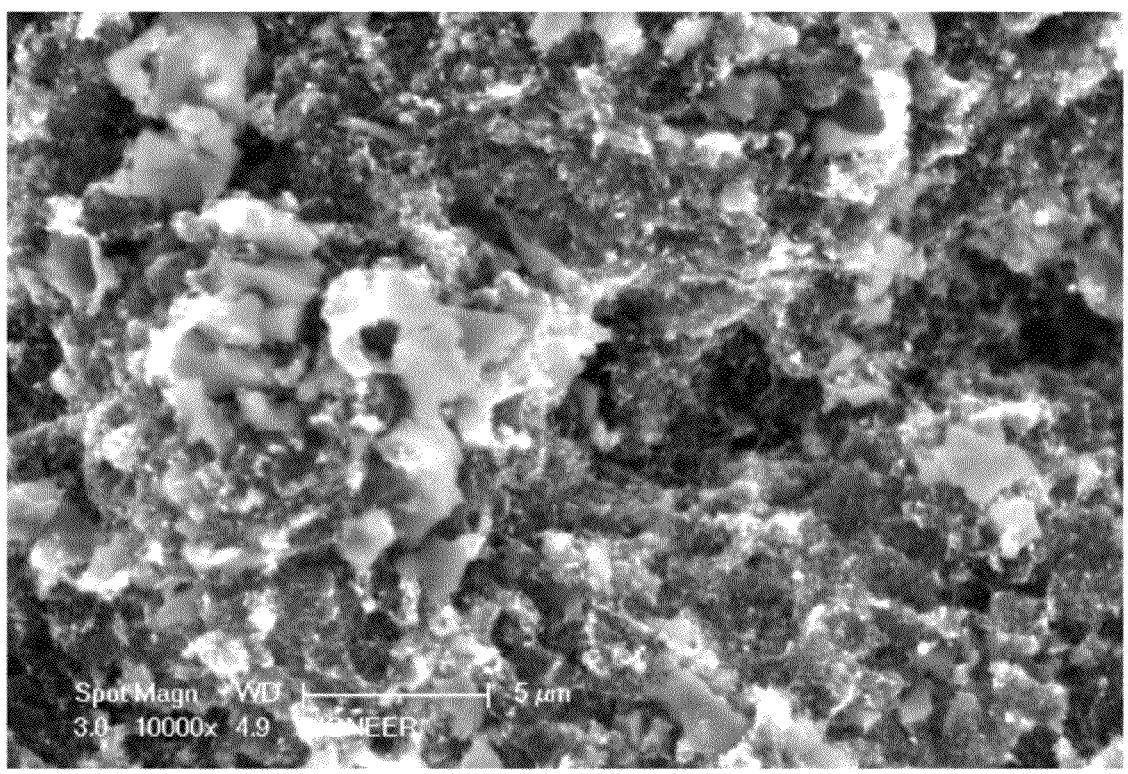
FIG. 7 is a SEM photograph of an oil filter prepared in Preparation Example 3.

Preparation of Carbon Nanotube-Silver Composite Nano Porous Membrane 0.34 g of the carbon nanotube-silver composites prepared in Preparation Example 1 was put into a 2,000 ml round flask, and 1,000 ml of ultra pure water and 1.5 g of sodium dodecyl sulfate (SDS) were added. The solution was dispersed for one hour at a temperature of 25 to 30° C. using ultrasonic waves and then filtered using a ceramic filter having a pore size of 0.2 μm. After the ceramic filter was coated with solid particles that did not pass through the filter, the ceramic filter was washed with 1 L of ethanol and 6 L of distilled water. The applied amount per unit area after washing was 1.04 mg/cm². Next, the ceramic filter coated with the carbon nanotube-silver composite was heat-treated in an oven for 8 hours at 95° C. and then dried. Then, the ceramic filter was cooled to room temperature, and fine residues thereof were washed with 2 L of ethanol and 6 L of ultra pure water. The ceramic filter was subjected to secondary heat treatment in the oven at 150° C. again, so that the silver was fused to the ceramic filter. As a result, a carbon nanotube-silver composite nano porous membrane was prepared. The surface of the prepared nano porous membrane was photographed using a SEM and is shown in FIG. 7. It could be observed that the fused silver particles were dispersed on the carbon nanotube. A porosity of the prepared nano porous membrane was measured based on ASTM F316 measurement using a Capillary Flow Porometer (Model CFP-12000AEM, available from Porous Materials Inc.), and the result of measurement showed that the average pore size was 54 nm.

Preparation Example 4

Preparation of Oil Filter Having a Carbon Nanotube-Nickel Composite Nano Porous Membrane An oil filter having a carbon nanotube-nickel composite nano porous membrane was prepared on the same conditions as in Preparation Example 3, except that the carbon nanotube-nickel composite synthesized in Preparation Example 2 was used as a composite and was subjected to secondary heat treatment in an oven at 260° C. The surface of the prepared oil filter was analyzed by a SEM. As a result, it could be observed that the nickel particles were dispersed on the carbon nanotubes.

Example 1

Purification of Waste Lubricant Using the Nano Porous Membrane

To test oil purification of a waste lubricant, 2 ml of waste lubricant that was collected from an actual garage was dissolved into 2 L of cyclohexane, thereby a waste lubricant dilution was prepared. The dissolved waste lubricant dilution was filtered by the oil filter prepared in Preparation Example 3. A sample was obtained and subjected to a particle size analysis by using a particle size analyzer (Zetasizer, available from Malvern).

Figure 8:
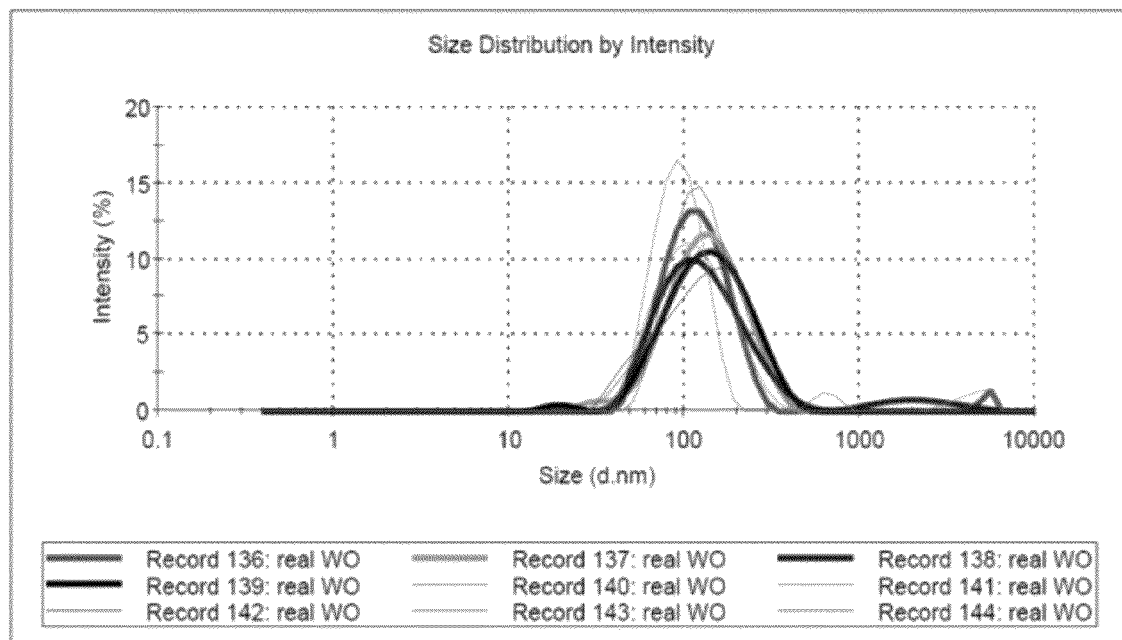
FIG. 8 shows the results of particle size analysis of unpurified waste oil.

FIG. 8 shows the results of repetitively measuring the particle size distribution of unpurified waste lubricant. It can be seen from FIG. 8 that particles between 50 nm and 6,000 nm were included in the waste lubricant. Further, it can be observed that most particles in the waste lubricant were 100 nm in size. This waste lubricant was passed through the ceramic filter (the filter used as a support in Preparation Example 3) that was not coated with the carbon nanotube-silver composite, and the particle size analysis was carried out. As a result, it could be observed that the particles having a size of 1 μm or more were filtered, but particles having a size of 1 μm or less were not filtered.

Figure 9:
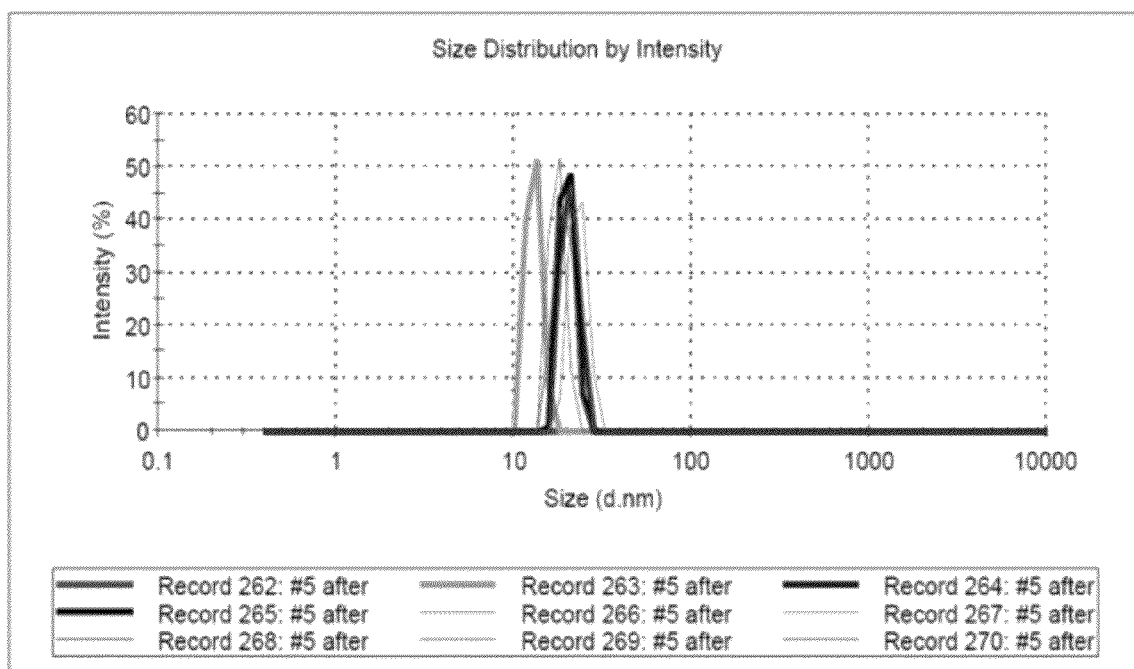
FIG. 9 shows the results of particle size analysis of waste oil purified by the oil filter according to Example 1 of the present invention.

FIG. 9 shows the results of repetitively measuring the particle size distribution of waste lubricant purified according to Example 1. It can be seen from FIG. 9 that the particles having a size of 100 nm to 50 nm which are not filtered by a typical ceramic filter (called a micro filter (MF)) were filtered and that particles between 10 nm and 20 nm were not filtered, i.e. were left behind. The remaining particles between 10 nm and 20 nm may serve to promote lubricating action. It is reported from documents that nano carbon particles having a lower size of 50 nm improve friction and wear performance of a lubricant (International Journal of Precision Engineering and Manufacturing, 2009, Vol 10, No 1, pp 85-90).

Example 2

Purification of High-Temperature Waste Lubricant Using the Nano Porous Membrane

Since a lubricant has a high viscosity and a very low flow rate at room temperature, the lubricant is difficult to purify using a nano porous membrane filter. For this reason, the lubricant was dissolved in the cyclohexane, and then the oil purification test was performed. To actually purify the waste lubricant as an undiluted solution using a nano porous membrane, the viscosity of the waste lubricant should be lowered by increasing temperature. Thus, the oil purification test of the waste lubricant at a high temperature was performed by heating the waste lubricant to 70° C. and filtering the heated waste lubricant using the oil filter prepared in Preparation Example 3. The flow rate of the lubricant passing through the nano porous membrane was measured to be 115.8 L/m² hr. It could be found that particles of about 100 nm in size were removed from the purified waste lubricant as in Example 1.

Exemplary embodiments of the present invention have been described above in detail with reference to the accompanying drawings. Further, specific details found in the preceding description are provided only to help comprehensive understanding of the present invention, and it is obvious to those skilled in the art that various changes or modifications in form and details may be made in the specific details without departing from the spirit and scope of the invention. Further, in the preceding description of the present invention, only portions needed to understand the operation of the present invention have been described, and the other portions have been omitted so as to make the subject matter of the present invention unclear.

DESCRIPTION OF CODES

1: Metal or metal oxide
2: Carbon nanostructures
3: Pore
10: An apparatus with an oil inlet and oil outlet
11: The first temperature control unit
12: The second temperature control unit
20: Oil purification unit
21: Oil inflow pipe
22: Oil outflow pipe
30: Oil heating unit

INDUSTRIAL APPLICABILITY

In the method and apparatus for purifying oil, the nano porous membrane has high thermal stability and allows various kinds of oil that can be used, for instance, for vehicles, ships, insulation, gears, or turbines to be purified when a mechanical apparatus is in operation. Further, the nano porous membrane can recycle waste oil used for a predetermined time at a high temperature.

The invention claimed is:
1. An apparatus for purifying oil comprising:
an oil inflow pipe into which the oil is introduced;
an oil purification unit that purifies the oil introduced from the oil inflow pipe and has a porous membrane containing carbon nanostructure-metal or -metal oxide composites of a network structure;
an oil outflow pipe through which the oil purified by the oil purification unit is discharged;
an oil heating unit that is installed on any one of the oil inflow pipe and the oil purification unit and heats the oil, and
an oil cooling unit that is installed on the oil outflow pipe and cools the discharged oil,
wherein the porous membrane comprising:
a membrane support having micro or nano-sized pores; and
the carbon nanostructure-metal or -metal oxide composites coated on one surface or both surfaces of the membrane support, wherein the metal of the carbon nanostructure-metal or -metal oxide composites is connected to the surface of the membrane support to form a network structure of carbon nano structure-metal or -metal oxide composites nanoporous film by melting or sintering of the metal,
wherein the porous membrane has a pore size between 10 nm and 500 nm, and
wherein a basis weight of the carbon nanostructure-metal or -metal oxide composites ranges from 0.05 mg/cm² to 10 mg/cm².

2. The apparatus according to claim 1, wherein the porous membrane has a network structure in which metal or metal oxide interconnects carbon nanostructures.

3. A system for purifying oil comprising:
a machine having an oil inlet and an oil outlet;
an oil inflow pipe that is fluid-connected with the oil outlet and introduces the oil discharged from the machine into an oil purification unit;
the oil purification unit that purifies the oil introduced through the oil inflow pipe and includes a porous membrane containing carbon nanostructure-metal or -metal oxide composites of a network structure;
an oil outflow pipe that is fluid-connected with the oil inlet and introduces the oil purified by the oil purification unit into the machine,
a first temperature control unit that is installed on the oil inflow pipe or the oil purification unit and controls the temperature of the oil discharged from the machine; and
a second temperature control unit that is installed on the oil outflow pipe and controls the temperature of the oil introduced into the machine,
wherein the porous membrane, comprising:
a membrane support having micro or nano-sized pores; and
the carbon nanostructure-metal or -metal oxide composites coated on one surface or both surfaces of the membrane support, wherein the metal of the carbon nanostructure-metal or -metal oxide composites is connected to the surface of the membrane support to form a network structure of carbon nanostructure-metal or -metal oxide composites nanoporous film by melting or sintering of the metal,
wherein the porous membrane has a pore size between 10 nm and 500 nm, and
wherein a basis weight of the carbon nanostructure-metal or -metal oxide composites ranges from 0.05 mg/cm$^2$ to 10 mg/cm$^2$.

4. The system according to claim 3, wherein the porous membrane has a network structure in which metal or metal oxide interconnects carbon nanostructures.

* * * * *